Feb. 3, 1959  W. M. HARCUM  2,871,704
INNER GIMBAL PICKOFF
Filed June 23, 1953
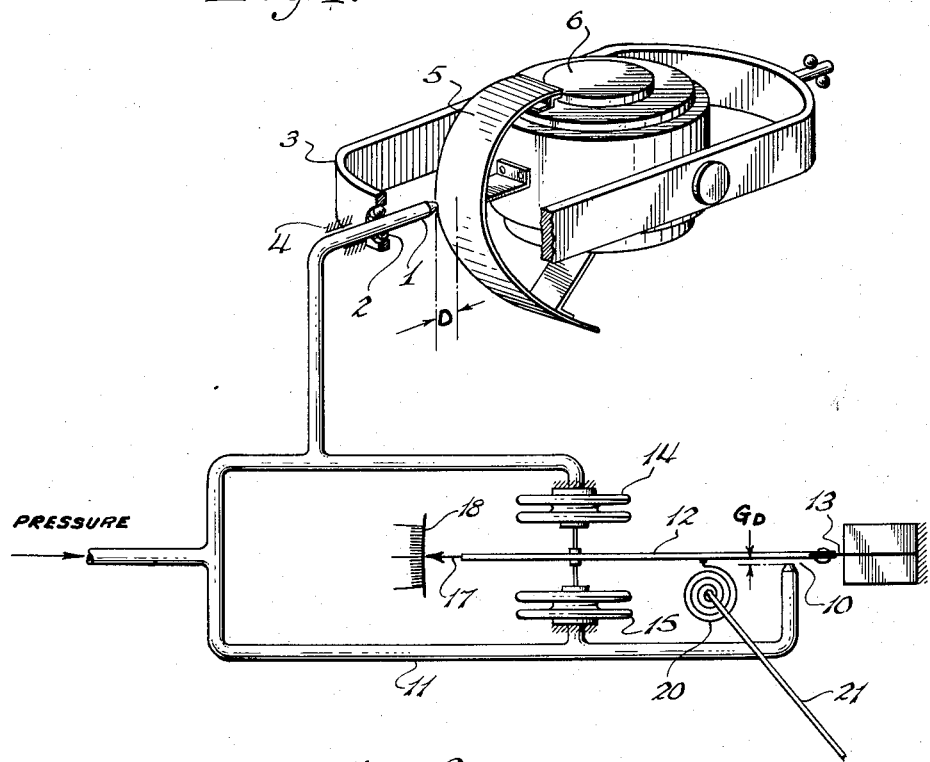
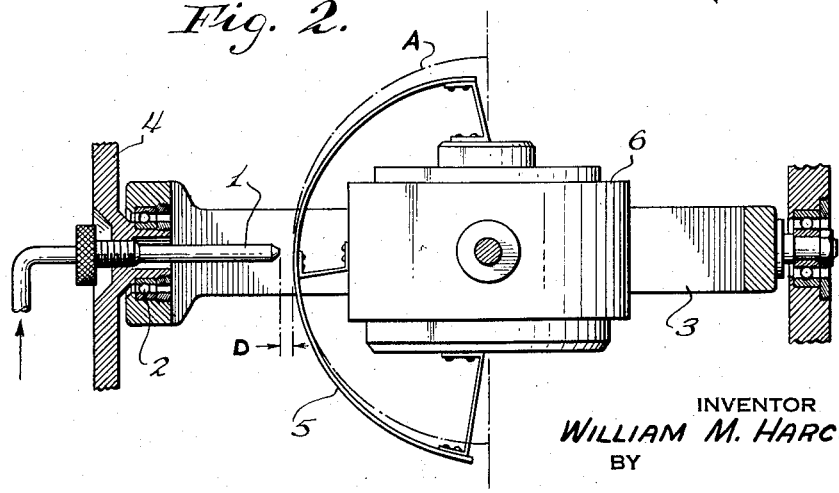
INVENTOR
WILLIAM M. HARCUM
BY
ATTORNEY United States Patent Office 2,871,704
Patented Feb. 3, 1959

2,871,704

INNER GIMBAL PICKOFF

William M. Harcum, Blue Bell, Pa., assignor to Tactair Inc., Bridgeport, Pa.

Application June 23, 1953, Serial No. 363,613

6 Claims. (Cl. 74—5.6)

This invention relates to gyroscopes and more particularly to a system for inner gimbal signal pickoff.

In gyroscopes having two degrees of gimbal freedom, it is often difficult to provide a signal pickoff to bring out information as to the position of the inner gimbal relative to the outer gimbal. When electric pickoffs are used it is usual to mount the stator of the pickoff on the outer gimbal and the rotor on the inner gimbal. It is then necessary to bring out the pickoff wiring through the outer gimbal bearings either by hairsprings or "pigtails" or by peripheral or center-point sliprings. With a synchro type pickoff on the inner gimbal the rotor leads must also be brought out through the inner gimbal bearings. In any case the necessity of electrical through connections causes either extra friction or limitations to the angular range or both.

Pneumatic sliprings for pickoffs between the gimbals have proved to be not entirely satisfactory because of extra signal losses and variations due to mechanical motions.

Bail rings, bevel gears with concentric bearings through the outer gimbal, bell crank rods and cables moving through the main outer gimbal pivot, all can provide an inner gimbal motion component to an external pickoff but they are all overcomplicated, require very accurate tolerances, and add appreciable friction to the gyro.

In the pickoff system of the present invention there are none of these disadvantages. As applied to a pneumatic gyro vertical according to the diagram a nozzle extends through the fixed front pivot and through a clearance hole in the outer gimbal at its axis of rotation. This nozzle does not rotate or touch the outer gimbal but is fixed to the main outer case of the instrument. A ribbon-like cam forming part of a figure of spiral revolution about the inner gimbal bearing axis is affixed to the rotor housing. The nozzle extends through the clearance hole in the outer gimbal almost to the ribbon cam. Since the cam is made with a slight spiral, the distance between the nozzle and the cam varies as a function of the relative position of the inner gimbal. This distance is independent of the roll position of the outer gimbal, with respect to the instrument case.

Accordingly, a principal object of the present invention is to provide new and improved signal pickoff means for gyroscopes.

Another object of the invention is to provide new and improved means for obtaining a signal proportional to the position of an inner gimbal with respect to an outer gimbal.

Another object of the invention is to provide new and improved means for obtaining signal pickoff by means of pressure responsive system.

Another object of the invention is to provide new and improved means for obtaining a signal from an inner gimbal using a pressure nozzle adapted to be loaded by a cam surface attached to the gyro rotor case.

Another object of the invention is to provide new and improved signal pickoff means which avoid the use of sliprings or the bringing out of leads from a rotatable body.

Another object of the invention is to provide new and improved signal pickoff means which are non-electrical.

These and other objects of the invention will be apparent from the following specification and drawings of which:

Figure 1 is a diagram showing an embodiment of the invention;

Figure 2 is a diagram showing a side view partially in section of a portion of the embodiment of Figure 1.

Referring to Figures 1 and 2, the present invention generally comprises a nozzle 1 which extends through the fixed front pivot bearings 2 of the outer gimbal 3. The nozzle 1 does not rotate or touch the outer gimbal 3 but is fixed to the outer case 4 of the instrument. A ribbon-like cam 5 is attached to the gyro rotor case 6, which is journalled in the outer gimbal 3, and the nozzle 1 extends through the gimbal 3 at its bearing almost to the cam 5. The cam 5 is connected and adapted to the rotor case 6 so that as the rotor case 6 pivots about the pitch axis relative to the outer gimbal, the distance D between the nozzle 1 and cam 5 varies, preferably in a linear manner. The function of the cam 5 is to load the output of the nozzle 1 so that the pressure in the nozzle conduit may be used as a measure of the position of the gyro relative to the outer gimbal. The distance will vary proportionally to pitch angle only since the cam is mounted so that rotation about the roll axis R will not change the distance D. Therefore, the pressure in the conduit connected to the nozzle may be measured by suitable means to provide a measure of pitch angle.

The pickoff cam, if desired, may be constructed as a double system with nozzles extending in from both front and back outer gimbal pivots and bearings to two ribbon cams. This would provide a two line signal system with a zero which is independent of supply pressures. This arrangement would also prevent any unbalanced mechanical side thrust.

The lower portion of Figure 1 shows a signal repeater system which is external to the gyro casing. This portion of the system is used to amplify and make linear the signal indication. For this purpose, a second repeater nozzle or orifice 10 is provided which is connected to the source of pressure by the conduit 11. The nozzle 10 is mounted closely adjacent the flapper 12 which is pivotally connected by the spring 13 to a fixed object. The flapper is connected near its free end to a pair of bellows 14 and 15 which are connected to the pressure source of the conduits 16 and 11 as shown. The free end of the flapper 12 has a pointer 17 which rides across an enlarged scale 18. The signal is amplified proportionally to the length of the flapper 12.

The pointer 17 will indicate the signal output on the scale 18 in a linear manner. The repeater system operates as follows: If the distance G between the nozzle 10 and the flapper 12 is different than the distance D between the cam 5 and the nozzle 1, there will be a differential pressure developed across the bellows system 14, 15, which will tend to make these distances equal. For instance, if the distance G is greater than D, there will be a greater pressure applied to the bellows 14 which will make the distance G less until it is equal to D. The bellows are preferably as non-restraining as possible.

An auxiliary pickoff may be placed on the pointer end of the flapper 12 and other signals for instance rate signals may be obtained therefrom in a conventional manner. Variations in the supply pressure or suction will not affect the calibration providing the bellows, or equivalent mounting, such as a diaphragm, is sensitive enough to balance the signals from the main and repeater pickoffs.

Figure 2 shows a side view of a portion of the embodiment of Figure 1. The dotted line A describes a semicircle about the axis P illustrating the fact that the cam 5 has a spiral configuration. That is the distance D between the cam and the nozzle 1 will vary as the rotor case 6 rotates about the axis P. The cam 5 may be described as a surface described by a line having a spiral motion with respect to the axis P.

As the surface of the cam rotates in pitch with the gyro rotor, the distance D will be a continuous smooth variation proportional to the pitch angle. The distance D will not be affected by roll angles that is, rotations of the outer gimbal about the roll axis.

As stated, a feature of the pickoff system is the external part used to obtain a linear output signal. The signal from a single nozzle and flapper or ribbon cam is not linear as shown and would also vary according to the supply pressure (or suction). For these reasons the second repeater nozzle and flapper combination is operated on the same pressure and suction as the one in the gyro. Any difference in output signals between the two nozzles is applied across pressure-responsive means such as sensitive bellows, diaphragm, or piston to move the repeater flapper arm to make the two signals alike. In this way the repeater flapper is made to keep the same nozzle distance as the cam-to-nozzle distance in the gyro. At the far end of the repeater flapper bar from its pivot there is a magnified linear motion proportional to cam distance or pitch angle.

Any auxiliary pickoff can be placed at this point. The external repeater assembly is very adaptable to biasing for instance, by spring 20 connected to lever 21, for changing the zero signal index point by manual command or by forces from an altitude control or glidepath. Rate signals can easily be taken here. Variations in the supply pressure or suction will not affect the calibration if the bellows or diaphragm is sensitive enough to effectively balance the signals from the main and repeater pickoffs.

Any of the electric capacity, electromagnetic, or variable reluctance and frequency pickoffs have signal vs. displacement characteristics similar to the curves for a single element. Use of a repeater pickoff with a motor type balance similar in effect to the pneumatic case described will provide a motion from which an auxiliary pickoff can be placed for linear calibration.

The invention is not limited to this particular configuration of cam but many cam surfaces may be used without departing from the scope of the invention. The only required characteristics are that the distance D should vary proportionally to pitch angle but should not vary according to roll angle.

I claim:

1. Signal pickoff means adapted to measure the angle of rotation of a part movable about a first axis comprising a pressure nozzle, a curved ribbon cam surface mounted on said part movable and positioned relative to said nozzle whereby the straight line distance between said nozzle and said cam varies proportionally with said angle of rotation about a first axis.

2. Signal pickoff means comprising a pressure nozzle mounted on fixed means, a cam mounted on a part movable with respect to said fixed means wherein the distance between said nozzle and said cam is a function of angular movement about one axis of said part and external signal repeater means connected to said nozzle comprising a repeater orifice connected to a common pressure with said nozzle, a pivotally mounted flapper mounted adjacent said repeater orifice, means connected to said flapper and said nozzle and orifice to position said flapper relative to said orifice the same distance as said cam from said nozzle.

3. Gyroscope signal pickoff means comprising a pressure nozzle mounted on the instrument case, a cam mounted on a part movable with respect to said case wherein the distance between said nozzle and said cam is a function of angular movement about one axis of said part and external signal repeater means connected to said nozzle comprising a repeater orifice connected to a common pressure with said nozzle, a pivotally mounted flapper mounted adjacent said repeater orifice, means connected to said flapper and said nozzle and orifice to position said flapper relative to said orifice the same distance as said cam from said nozzle and a pointer attached to said flapper.

4. Gyroscope signal pickoff means comprising a pressure orifice mounted on the instrument case and extending through the pivot of the outer gimbal, a cam mounted on an inner gimbal movable with respect to said case whereby the distance between said nozzle and said cam is a function of angular movement about one axis of said inner gimbal.

5. Gyroscope signal pickoff means comprising a pressure orifice mounted on the instrument case and extending through the pivot of the outer gimbal, a cam mounted on an inner gimbal movable with respect to said case whereby the distance between said nozzle and said cam is a function of angular movement about one axis of said inner gimbal, and signal repeater means connected to said nozzle.

6. In a signal pickoff system for a gyroscope including a frame, gimbal means pivotally mounted in the frame and a gyro rotor journalled in the gimbal means to move therewith, the invention comprising a hollow pivot for said gimbal means, a sensing member carried by the frame to extend through the hollow pivot, a cam mounted on gimbal means to pivot therewith, said cam and sensing member being disposed proximate to one another in complementary relationship and separated by an air-gap, means to energize the sensing member to react against the cam to establish in conjunction therewith a parameter variable as a function of the angular position of the cam as it moves with the gimbal means, and output means coupled to the sensing member responsive to said parameter as it is reflected in the sensing member.

References Cited in the file of this patent

UNITED STATES PATENTS

| | | |
|---|---|---|
| 1,592,081 | Colvin | July 13, 1926 |
| 1,729,850 | Wunsch | Oct. 1, 1929 |
| 2,091,964 | Carter | Sept. 7, 1937 |
| 2,129,586 | Moller | Sept. 6, 1938 |
| 2,195,351 | Ziebolz | Mar. 26, 1940 |
| 2,284,795 | Belaef | June 2, 1942 |
| 2,428,345 | Turner | Sept. 30, 1947 |
| 2,484,022 | Esval | Oct. 11, 1949 |
| 2,512,598 | Barkalow | June 27, 1950 |

FOREIGN PATENTS

| | | |
|---|---|---|
| 995,527 | France | Aug. 22, 1951 |